Patented June 14, 1932

1,862,599

UNITED STATES PATENT OFFICE

WILHELM LOMMEL, OF WIESDORF-ON-THE-RHINE, AND THEODOR GOOST, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CATALYTIC MANUFACTURE OF HEXA HYDRO ANILINE

No Drawing. Application filed October 12, 1928, Serial No. 312,206, and in Germany November 26, 1926.

The present invention relates to the catalytic manufacture of hexa hydro aniline from aniline by means of hydrogen in the presence of a cobalt catalyst under super-atmospheric pressure.

Up to the present the attempts of catalytically hydrogenating aniline have not led to any technical success, principally for the reason that the hydrogenation proceeds too slowly and at the same time the amount of by-products produced is too large. Thus, for example, the hydrogenation under superatmospheric pressure recommended by Ipatief requires 50 hours and yields only 40 to 50% of hexa hydro aniline with about 20% of by-products (see Ipatief, Berichte der Deutschen Chemischen Gesellschaft volume 41, page 991.) Conversely the gaseous hydrogenation worked out by Sabatier produces over 60% of undesirable by-products (see Sabatier, Comptes rendues de l'acad. de science vol. 138, page 457). Both authors have used nickel or nickel oxides as catalysts.

In accordance with the present invention the hydrogenation under superatmospheric pressure can be carried out at elevated temperature, practically without the formation of by-products, by replacing the nickel catalysts above mentioned by a cobalt catalyst.

The reaction is advantageously performed at a temperature range of from about 170° to about 350° C. and under a pressure above about 50 atmospheres for instance of from about 100 to about 150 atmospheres in the presence of a cobalt catalyst. We wish it to be understood that the term "cobalt catalyst" includes metallic cobalt as well as cobalt oxides and suitable salts of cobalt (such as cobalt carbonate- oxalate-formiate e. a.) either alone or in admixture with one another or with suitable carriers.

The following example will illustrate our invention, without limiting it thereto:

*Example.*—100 parts by weight of aniline are heated to 250–300° C. in a stirring autoclave with 2 parts by weight of cobalt oxide with hydrogen under a pressure of about 100 atmospheres. 88% of hexa hydro aniline are produced already after half an hour.

The catalyst can be prepared f. i. by treatment of cobalt salts with ammonia and sodium carbonate.

When metallic cobalt is used this too is found to be superior to nickel as catalyst.

This application is a continuation in part of our application Ser. No. 232470 filed on November 10, 1927.

We claim:—

1. In the process of producing hexahydro aniline, the step which comprises treating aniline with hydrogen in the presence of a cobalt catalyst under super-atmospheric pressure, at a temperature range of from about 170° to about 350° C.

2. In the process of producing hexahydro aniline, the step which comprises treating aniline with hydrogen in the presence of a cobalt catalyst at a temperature range of from about 170° to about 350° C. and at a pressure above about 50 atmospheres.

3. In the process of producing hexahydro aniline, the step which comprises treating aniline with hydrogen in the presence of a catalyst containing cobalt oxide under a pressure above about 50 atmospheres and at a temperature range of from about 170° to about 350° C.

4. In the process of producing hexahydro aniline, the step which comprises treating aniline with hydrogen in the presence of cobalt oxide under a pressure above about 50 atmospheres and at a temperature range of from about 170° to about 350° C.

5. In the process of producing hexahydro-aniline the step which comprises treating aniline with hydrogen in the presence of a catalyst containing cobalt oxide, under a pressure of from about 100 to about 150 atmospheres and at a temperature of from about 250 to about 300° C.

6. In the process of producing hexahydro aniline, the step which comprises treating aniline with hydrogen in the presence of cobalt oxide at a pressure of about 100 atmospheres and at a temperature of from about 250 to about 300° C.

In testimony whereof we have hereunto set our hands.

WILHELM LOMMEL. [L. S.]
THEODOR GOOST. [L. S.]